United States Patent Office 2,732,739
Patented Jan. 31, 1956

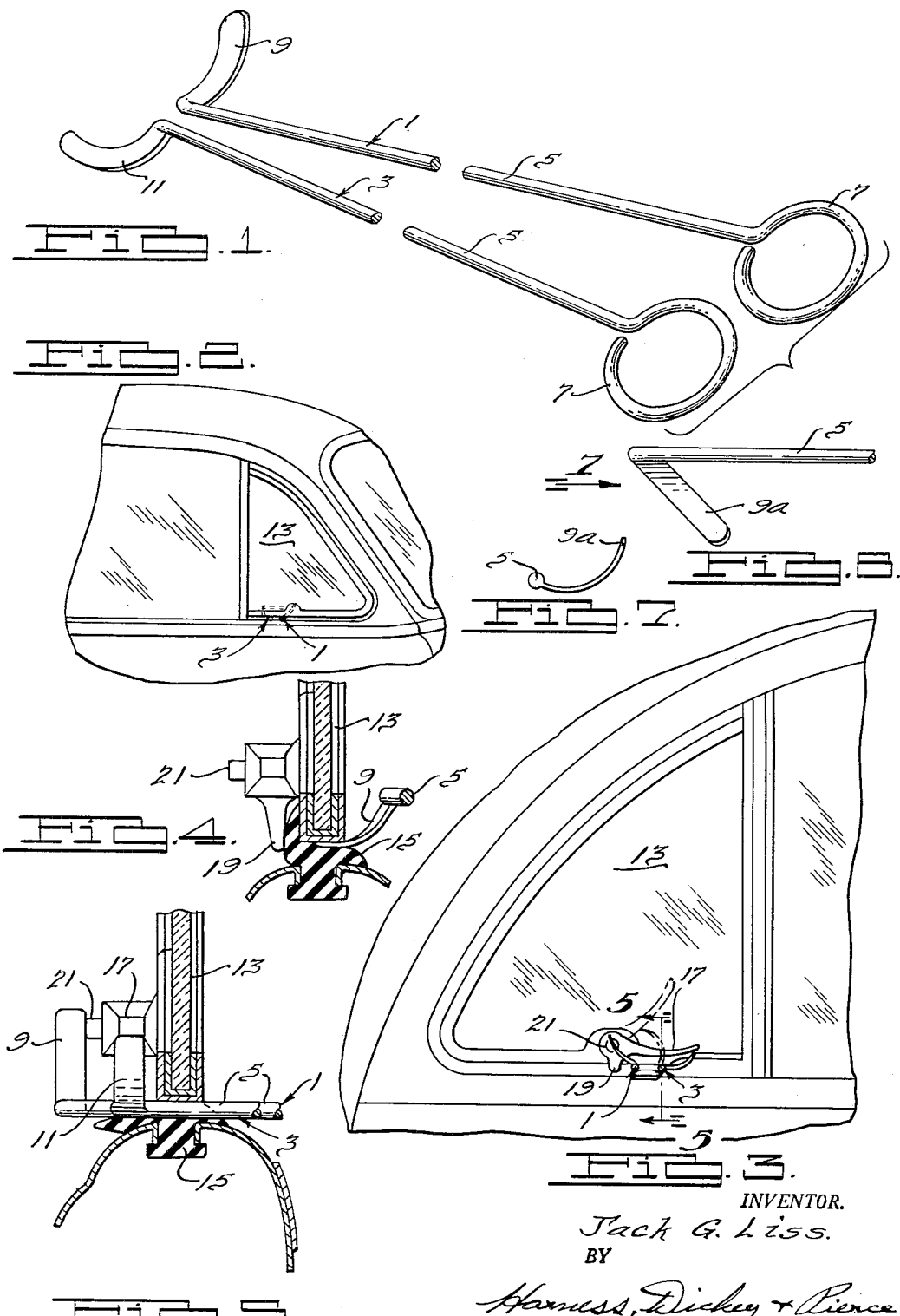

2,732,739

AUTOMOBILE ENTRY TOOL

Jack G. Liss, Livonia, Mich.

Application May 5, 1952, Serial No. 286,133

4 Claims. (Cl. 81—3)

This invention relates to accessories for automobiles and, in particular, to tools for entering locked automobiles.

Most car owners have had the experience of being locked out of their automobiles because of frozen or defective locks or because of unavailability of a key. In the past, there have been methods of unlocking the door by entry through the floorboard of the car but, in general, these methods have been rendered obsolete by changes in construction of the vehicle bodies. In the majority of automobiles now in use, it is necessary to either break a window or destroy certain parts of the car in order to open the door without the key.

Accordingly, it is an object of this invention to provide automobile entry means which make it possible to enter a locked automobile without the need for injuring any of the parts of the automobile. The device finds particular favor with police departments, garage men, automobile clubs, repossessing organizations, and the like who want to enter a locked car without resorting to the primitive methods of breaking a window or destroying weather stripping and the like.

The invention contemplates a simple tool comprising a long rigid shank having a thin transverse finger at one end which preferably is arcuate about the shank as an axis. The other end of the shank is preferably provided with a loop which serves as a handle and also as a means to engage the window opening lever for the purpose of cranking down the window once the car has been entered. It is possible with this tool to enter the automobile through the weather welt or stripping for the no-draft ventilation window. When the tool has thus been projected into the automobile, it can then be manipulated either by itself or with another tool of like nature to unlock and open the no-draft ventilation window. Once this window is open, it is a simple matter to open the door.

The invention is shown by way of illustration in the accompanying drawings, wherein:

Figure 1 is a perspective view of a left-hand and a right-hand tool comprising the automobile entry means of this invention;

Fig. 2 is a partial side elevation from the outside of an automobile showing the tools inserted underneath the no-draft ventilation window;

Fig. 3 is a partial side elevation from the inside of an automobile showing the tools of this invention in operative position;

Fig. 4 is a partial section through a no-draft ventilation window and its weather welt showing the initial stage of entry of the tool of this invention;

Fig. 5 is a section taken along the line 5—5 of Fig. 3;

Fig. 6 is a plan view of a slightly modified form of tool construction in accordance with the principles of this invention; and Fig. 7 is an end view of the tool shown in Fig. 6 as taken from position 7 in Fig. 6.

In Fig. 1 are shown left-hand and right-hand automobile entry tools 1 and 3 which are constructed in accordance with the principles of the invention. Each of these tools has an elongated rigid shank 5 which is preferably constructed of heat treated spring steel so that it has sufficient stiffness to resist plastic deformation. At one end, each shank is bent into a loop 7 which serves as a handle and also is capable of being fitted around the knob of the window crank on the automobile door and thus of rotating the crank to lower the window. The opposite end of the tool has a finger 9 which is preferably formed by bending the end of the shank 1 at a right angle and then flattening it out to a thickness which is substantially less than that of the shank and so that it tapers to a thin edge at its outer end. The finger 9 is preferably arcuate about substantially the axis of the shank 5 and thus constitutes, in effect, sort of a scoop. The tool 3 has a finger 11 which is the same as the finger 9 except that it extends to the left of the shank instead of to the right as does the finger 9. Not only the shank but the entire tool 1 or 3 is preferably heat treated so that the handle, shank, and finger are relatively rigid and stiff.

In using the tool, the shank 5 is placed parallel to the length of the car and the finger 9 is inserted between the bottom of the no-draft window 13 and the weather welt 15 as shown in Fig. 4. Since the finger 9 is very thin, this entry is easy to accomplish and is facilitated by the arcuate shape of the finger 9 which makes it possible to accomplish entry by a slight rotation of the shank 5 as well as lateral translation. As the finger 9 enters, it compresses the weather welt 15 without destroying it or injuring it in any way and it eventually is compressed to the point where the shank 5 can also fit in the space underneath the window 13 as will be seen in Fig. 5. The automobile illustrated is a late model Chevrolet and, as is well known, its no-draft window has a locking handle 17 with a nib 19 that engages a fixed part of the door to hold the window closed. Pivotal movement of the handle 17 is prevented by a detent 21 which must be compressed by outward movement before the handle 17 can be pivoted upwardly. Thus, the tool 1 in Fig. 3 is inserted first and the shank is turned at a right angle to the length of the car and pulled outwardly so that a side edge of the finger 9 engages the detent 21 and thus a pull on the tool 1 will compress the detent to permit the lever 17 to be pivoted. A tool 3 is inserted in the same manner as shown in Fig. 1 and the end of its finger 9 will engage the lever 17 as best shown in Fig. 3 so that the rotation of the shank by twisting of the handle 7 will lift the lever 17 and unlock the window 13. Once this window is opened, it is ordinarily possible to reach either the door handle or the window crank by hand and thus to open the door or window. If this is not possible, one of the tools 1 and 3 can be turned end for end and the loop 7 placed over the window crank or the door handle to manipulate it and obtain entry to the car.

The different makes of automobiles have several different means for locking the no-draft ventilation window. The current Chrysler products, for example, have a knurled nut which must be rotated before the locking member can be moved to unlock the window. It will be appreciated by a look at Figure 3 that the end of the finger 9 can very easily engage the knurls of such a locking nut to rotate it and make it possible to unlock the window. Other types of non-spring-pressed locks can be opened by use of a single tool. It will also be a fairly simple and obvious matter for those using the tools to unlock the various other types of locking means used for no-draft ventilation windows; it being possible to open, among other cars, the current Buick, Dodge, Plymouth, Ford, Pontiac, and Mercury with two tools in a manner similar to that already described. In no-draft windows of the type that is opened by means of a handle, the tool is turned end for end after the no-draft window is unlocked and the loop 7 inserted and used to turn the handle.

Figs. 6 and 7 show a modified form of the tool wherein the finger 9a extends rearwardly of the shank 5, that is, it makes an acute angle with the shank, preferably, an angle of around 45 degrees as illustrated. The finger 9a is also arcuate substantially about the axis of the shank 5. Only one tool of this shape needs to be used in opening some windows as the shape is such as to permit the finger 9a to simultaneously engage and disable the spring lock and also operatively engage the latch member.

I claim:

1. An automobile entry tool comprising an elongated rigid straight shank and a rigid finger extending transversely from one end of the shank, said finger being arcuate substantially about an axis parallel to the longitudinal axis of the shank and being of substantially less radial thickness than the shank.

2. An automobile entry tool comprising an elongated rigid straight shank and a rigid finger extending transversely from one end of the shank, said finger being curved about an axis parallel to the longitudinal axis of the shank and of substantially less thickness than the shank and making an acute angle with the shank.

3. The invention according to claim 4 wherein said finger extends at substantially a right angle to the shank.

4. The invention according to claim 4 wherein said finger makes an acute angle with the shank.

References Cited in the file of this patent

UNITED STATES PATENTS

| | | |
|---|---|---|
| 2,027,009 | Wyscaver | Jan. 7, 1936 |
| 2,344,696 | Graham | Mar. 21, 1944 |

OTHER REFERENCES

The Manual of Locksmithing, 1941 edition, pages 361 to 368.